(12) United States Patent
Veeranathan et al.

(10) Patent No.: US 10,996,903 B2
(45) Date of Patent: May 4, 2021

(54) APPARATUS AND METHOD FOR REDUCING ENERGY USE IN A MULTI-FUNCTION DEVICE

(71) Applicant: Xerox Corporation, Norwalk, CT (US)

(72) Inventors: Thillaivasan Veeranathan, Tamil Nadu (IN); Lijo Poulose, Tamil Nadu (IN); Sudhakar Subramaniyan, Tamil Nadu (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/543,740

(22) Filed: Aug. 19, 2019

(65) Prior Publication Data
US 2021/0055895 A1    Feb. 25, 2021

(51) Int. Cl.
| G06F 3/12 | (2006.01) |
| H04N 1/00 | (2006.01) |
| G03G 15/00 | (2006.01) |
| G06F 1/3203 | (2019.01) |
| G06F 1/3206 | (2019.01) |

(52) U.S. Cl.
CPC ....... *G06F 3/1221* (2013.01); *G03G 15/5004* (2013.01); *G06F 1/3203* (2013.01); *G06F 1/3206* (2013.01); *G06F 3/1204* (2013.01); *G06F 3/1211* (2013.01); *G06F 3/1268* (2013.01); *G06F 3/1285* (2013.01); *H04N 1/00885* (2013.01); *H04N 1/00896* (2013.01)

(58) Field of Classification Search
None
See application file for complete search history.

(56) References Cited

U.S. PATENT DOCUMENTS

| 6,819,445 | B1 | 11/2004 | Stevenson et al. |
| 7,295,786 | B2 | 11/2007 | Brinsley |
| 9,838,557 | B2 | 12/2017 | Tsongas et al. |
| 2008/0120512 | A1* | 5/2008 | Wang .................. G06F 11/3041 713/300 |
| 2013/0063755 | A1* | 3/2013 | Stevenson ............. G06F 1/3284 358/1.13 |

(Continued)

OTHER PUBLICATIONS

European Search Report, 20188957.3-1203, dated Jan. 19, 2021.

*Primary Examiner* — Miya J Williams
(74) *Attorney, Agent, or Firm* — Jones Robb, PLLC

(57) ABSTRACT

Systems, methods, and devices are configured to reduce energy use in a printing or multi-function device. They include monitoring at least one characteristic associated with operation of a multi-function device in a first mode of operation. They further include determining when a value of the at least one characteristic exceeds a threshold value and communicating programming information associated with operation of the multi-function device in a second mode of operation to a programmable network interface device when it is determined that the value of the at least one characteristic exceeds the threshold. The programming information changing the operating conditions associated with network communication by the programmable network interface device. The printing or multi-function device then operates in the second mode of operation based on the conditions associated with the network communication by the reconfigurable network interface device.

19 Claims, 6 Drawing Sheets

(56) References Cited

U.S. PATENT DOCUMENTS

| | | | |
|---|---|---|---|
| 2014/0064753 A1* | 3/2014 | Saeki .................... | G03G 21/20 |
| | | | 399/43 |
| 2016/0078332 A1* | 3/2016 | Omodaka ............ | G06K 15/405 |
| | | | 358/1.14 |
| 2017/0064097 A1* | 3/2017 | Yamamoto ............ | G06F 3/1205 |
| 2018/0159999 A1 | 6/2018 | Ito | |
| 2019/0354329 A1* | 11/2019 | Amarendra ........... | G06F 3/1236 |

\* cited by examiner

APPARATUS AND METHOD FOR REDUCING ENERGY USE IN A MULTI-FUNCTION DEVICE

TECHNICAL BACKGROUND

Printer systems, such as printers, printer/scanners, and multi-function devices (MFDs) allow users to create and submit a processing job, such as a print job, a copy job, or scan job, from a physical or electronic document and produce an output as a physical printed or electronic ready-to-print document These printer systems are often networked as part of a home or office network configured to allow a user access to any one of the devices. Networked printers also allow the user to access or create an electronic document from a job created as a print job, copy job, or scan job on one MFD or printer device and print the electronic document on any other printer or MFD on the network. Printer systems are an important part of a productive home or office environment.

However, printer systems are often not in use for long periods of time, even in office environments. Printer systems are often complex devices requiring a significant amount of electrical energy or power to operate and keeping the systems in full power mode, even when not in use, is not energy efficient. Most all printer systems have some form of power saving operating mode. Many printer systems include some mechanism to enter a low power or standby mode when an operating characteristic, such as a time period of inactivity, is detected. The low power or standby mode may turn off all the elements of the printer system except for certain low power configurations of the processor or controller and some aspects, such as a touch sensor, on a user interface. The low power or standby mode may be exited by, for instance, a user touch or entry on the user interface on the printing system. After the touch or entry, the user interface communicates with the processor to resume full operational mode which typically further communicates with the remaining elements in the printer system to resume full operational mode as well.

Networked printer systems further complicate operating and configuration of a low power or standby mode. In order to recognize network communication that may include requests for activity or use on networked printer systems, the network communication interface component (e.g., a dedicated integrated circuit) on each of the networked printer systems must remain fully operational. As a result, all network communication traffic identified with a particular printer system is received by its network communication interface component and decoded. The network communication interface component provides the data as a communication signal, along with an indication to wake-up from standby mode (e.g., as an interrupt or request to process message) to the processor. The processor typically enters full operational mode to determine the action necessary to service the communication request. Even if the processor only needs to generate a reply message to a network management request, the processor still consumes additional electrical energy for each one of the communication requests from the network communication interface component as a result of periodically exiting low power mode. In some instances, network management requests may be configured by the network administration to occur many times a day. As a result, in addition to requiring a fully operational network communication interface circuit, the additional time necessary to have the processor in full operational mode further reduces energy efficiency of the printer system in low power or standby mode. Therefore, there is a need to address the issues associated with improving energy efficiency of printer systems operating on a network by reducing electrical energy use during operation of a low power or standby mode.

OVERVIEW

Exemplary embodiments described herein include methods, systems, and apparatuses for releasing a secure print job between users. An exemplary multi-function apparatus includes a programmable device that includes logic for communicating with a network. The multi-function apparatus additionally includes a print processor that monitors at least one characteristic associated with operation of the multi-function apparatus in a first mode of operation. The print processor also determines when a value of the at least one characteristic exceeds a threshold value and communicating programming information associated with operation in a second mode of operation to the programmable device when it is determined that the value of the at least one characteristic exceeds the threshold value, the programming information allowing the programmable device to maintain communication with the network in the second mode of operation. The multi-function apparatus further operates in the second mode of operation when the programming of the programmable device with the information is complete.

An exemplary method includes monitoring at least one characteristic associated with operation of a multi-function device in a first mode of operation. The method additionally includes determining when a value of the at least one characteristic exceeds a threshold value and communicating programming information associated with operation of the multi-function device in a second mode of operation to a reconfigurable network interface device when it is determined that the value of the at least one characteristic exceeds the threshold, the programming information changing the operating conditions associated with network communication by the reconfigurable network interface device. The method further includes operating in the second mode of operation based on the conditions associated with the network communication by the reconfigurable network interface device.

An exemplary apparatus includes a memory for storing information associated with programming a programmable device to operate in at least two operating modes. The apparatus also includes a processor configured to determine when a value of at least one characteristic associated with operating in a first mode of operation exceeds a threshold value and communicate programming information associated with operation of the programmable device in a second mode of operation to the programmable device when it is determined that the value of the at least one characteristic exceeds the threshold value, the programming information changing the conditions associated with network communication by the programmable device.

BRIEF DESCRIPTION OF THE DRAWINGS

These and other aspects, features, and advantages of the present disclosure will be described or become apparent from the following detailed description of the preferred embodiments, which is to be read in connection with the accompanying drawings.

Figure 1:
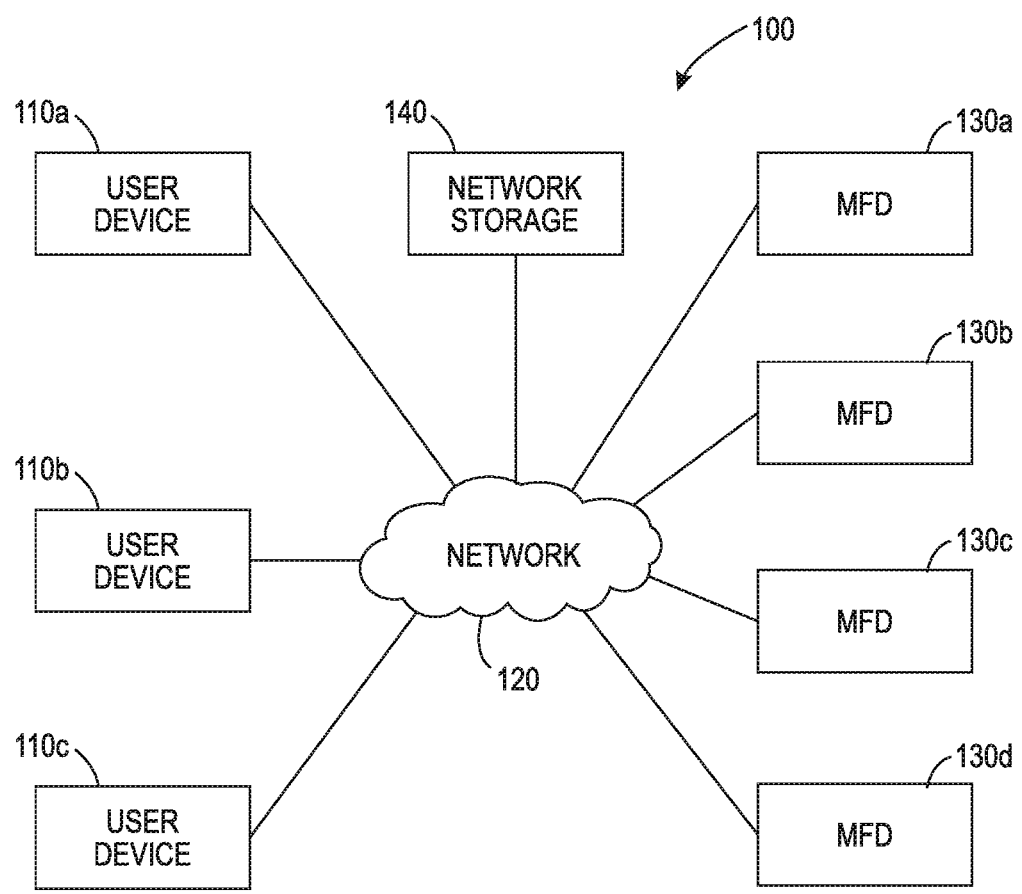
FIG. 1 depicts an exemplary system incorporating the principles of reducing energy use in a printing device or MFD.

It should be understood that the drawing(s) are for purposes of illustrating the concepts of the disclosure and are not necessarily the only possible configuration for illustrating the disclosure.

DETAILED DESCRIPTION

The present embodiments are directed towards problems associated with improving energy efficiency of printing devices or MFDs. In particular, the present embodiments address issues with reducing electrical energy use during operation in printing devices or MFDs that operate on a network in a low power or standby mode. The implementation of one or more of the aspects of the processes, mechanisms, systems, and devices of the present embodiment replace the dedicated physical Ethernet circuit used for interfacing to the network with a reconfigurable or programmable logic circuit that can be configured to include a version of Ethernet hardware logic capable of performing the same functions. The reconfigurable or programmable logic circuit is also configured to include separate processing logic that is capable of monitoring incoming messages received by the Ethernet hardware logic while operating in low power or standby mode. The processing logic may filter unwanted messages, may provide responses to certain messages received from the network, and further may provide a wakeup signal to the main processor to enter a normal or full power state only when a message including a request for activity, such as a print job, is received. In this manner, the lower energy use processing logic in the reconfigurable or programmable logic circuit operates in place of the higher energy main processor while handling any messages that do not require the printing device or MFD to return to normal or full power mode.

When the printing device or MFD operates in a normal or full power mode, the reconfigurable or programmable logic circuit is configured to include Ethernet hardware logic and may further be configured to include logic associated with specific functions or elements included as part of a particular model or type of printing device or MFD. When the printing device or MFD recognizes a condition to enter a low power or standby mode, the main processor provides program instructions to configure the reconfigurable or programmable logic circuit with Ethernet hardware logic and separate processing logic as described above. In some instances, the Ethernet hardware logic used as part of low power or standby mode may be a lower performance, lower energy use version than that used as part of normal or full power mode. When a message is received from the network during low power or standby mode that requires activity on the printing device or MFD, the separate processing logic provides a wakeup signal to the main processor. The main processor provides program instructions to configure the reconfigurable or programmable logic circuit as it was configured for operation in the normal or full power mode.

The implementation of the present embodiments provides additional energy savings over known approaches used in printing devices or MFD design. The implementation also eliminates the use of a separate external Ethernet circuit, saving both space and cost in the printing device or MFD. The implementation further provides capability of improvements in energy use or other changes or improvements in future through the introduction of new programming instructions for the reconfigurable or programmable logic circuit in the printing device or MFD. It is important to note that although the present embodiments are described with respect to printing devices or MFDs, many of the aspects of the present embodiments may be applied to other electronic devices that operate on a network and utilize or require a low power or standby mode of operation.

These and additional operations are further described with respect to the embodiment depicted in FIGS. 1-5 below.

FIG. 1 illustrates an exemplary system 100 for releasing a secure print job between users. System 100 includes a plurality of user devices 110*a*-110*c* coupled to a plurality of MFDs 130*a*-130*d* as well as network storage 140 through a network 120. User devices 110*a*-110*c* and MFDs 130*a*-130*d* may be located throughout sites within the same building or dwelling and connected through one or both of a wired and wireless local area network using a communication protocol including, but not limited to, Institute of Electrical and Electronics Engineers (IEEE) standard 802.3, Wi-Fi, and IEEE standard 802.11. One or more of user devices 110*a*-110*c* and/or network storage 140 may additionally be located in a different or remote facility from the dwelling or building where the one or more of the MFDs 130*a*-130*d* are located. The one or more remotely located user devices 110*a*-110*c* may be communicatively coupled to the one or more MFDs 130*a*-130*d* through a private or public network using a communication protocol including, but not limited to, Internet Protocol or any cellular communication protocols.

In operation, system 100 performs various aspects of a mechanism for sharing a job between users. The mechanism may be performed entirely in one or more of MFDs 130-130*d*. In some instances, some portions of the mechanism may be performed in one or more of user devices 110*a*-110*c*. The mechanism includes monitoring at least one characteristic associated with one of the MFDs 130*a*-130*d* when operating in a first mode of operation. The first mode of operation may be referred to as a normal operating mode or full power mode. The mechanism additionally includes determining when a value of the at least one characteristic being monitored in the one of the MFDs 130*a*-130*d* exceeds a threshold value. If the at least one characteristic exceeds the threshold value, then programming information associated with operation of the one of the MFDs 130*a*-130*d* in a second mode of operation is communicated to a reconfigurable network interface device in the one of the MFDs 130*a*-130*d*. The programming information includes information that alters or changes the operating conditions associated with communication on network 120 by the reconfigurable network interface device. The second mode of operation may be referred to as a low power, power-save, or standby mode. As described in the present application, standby, standby mode, or any similarly identified mode is a mode used by a device that requires a small amount of energy or current to maintain a current state of certain aspects of a device, such as one of MFDs 130*a*-130*d*, without having operation of any remaining aspects of the device available for use by a user.

The one of the MFDs 130a-130d begins operating in the second mode of operation based on the conditions associated with the communication with network 120 by the reconfigurable network interface device after programming the reconfigurable network interface device is completed. In some embodiments, programming information associated with the operation of the of the one of the MFDs 130a-130d in the first mode of operation is communicated to a reconfigurable network interface device based on monitoring communication with network 120 by the reconfigurable network interface device in order for the one of the MFDs 130a-130d to return to operating in the first mode of operation.

The user devices 110a-110c may be any one of a personal computer, a laptop computer, a computer network terminal, a tablet, a cellular phone, a smartphone, and the like. User devices 110a-110c may include processors, displays, communication interfaces, user interfaces, and memories, along with various program modules stored in a memory and executed by a processor, to implement specific functions, such as print servers, print drivers, graphic user interface menus, and communication protocols. MFDs 130a-130d may be any one of a printer, a printer/fax machine, a printer/scanner machine, and the like. MFDs 130a-130d may include one or more processors, a printer mechanism, mechanical printing media processors, a network interface, a user interface, and storage elements, along with various program modules stored in the storage elements and executed by the one or more processors. Details related to devices similar to MFDs 130a-130d will be described in further detail below.

Network storage 140 may include one or more storage elements including, but not limited to, single hard drives, parallel connected or redundant array of independent disks (RAID) drives, optical drives, and solid-state drives using static or dynamic storage mechanisms. Network storage 140 may be located in one location as part of one device or may be distributed across a number of devices and/or distributed across a number of locations. In some embodiments, all or a portion of network storage 140 may operate on a network external to network 120 or in the cloud and be interfaced to user devices 110a-110c and/or MFDs 130a-130d as described above.

Figure 2:
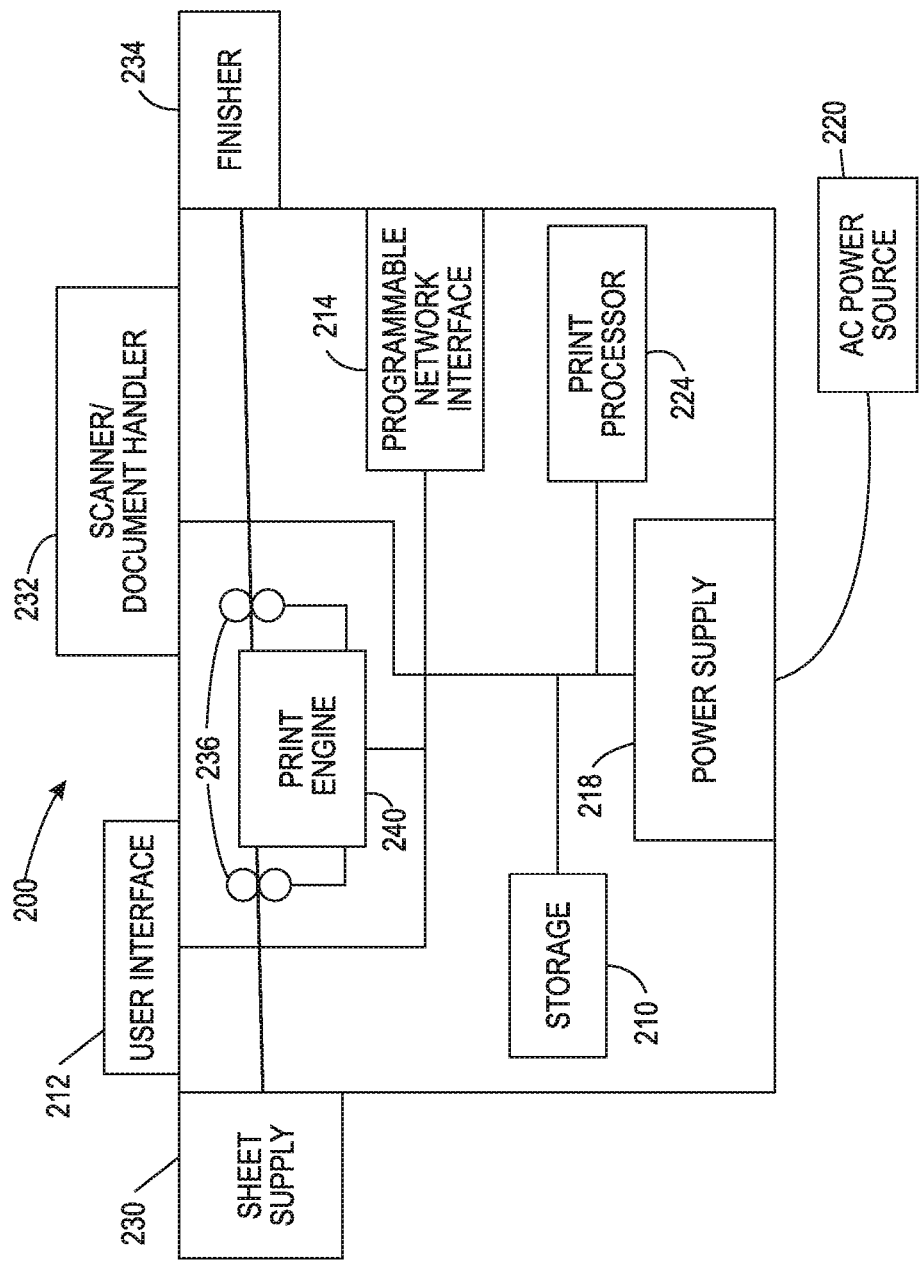
FIG. 2 depicts an exemplary printing device or MFD incorporating the principles of reducing energy use.

FIG. 2 illustrates an exemplary MFD 200, which can be used for releasing a secure print job between users. MFD 200 may operate in a manner similar to MFDs 130a-130d described in FIG. 1. MFD 200 may also be embodied as, or incorporated in, a printer, copier, multi-function machine, or other device that includes the capability to print, scan, and/or copy a document, including an electronic document, on a physical printable and/or readable media, such as paper. MFD 200 includes a marking device or printing engine 240 capable of printing markings on sheets of print media, a print processor 224 operatively coupled to the printing engine 240, a user interface 212 operatively coupled (not shown) to the print processor 224, and a programmable network interface 214 operatively coupled to the print processor 224 and printing engine 240. A storage element 210 is also operatively coupled to programmable network interface 214, print processor 224, and printing engine 240. Printing engine 240 is also operatively coupled to sheet supply 230, scanner/document handler 232, media path 236, and finisher 234. Power supply 218 receives input from power source 220 and provides power to components in MFD 200 including storage element 210, programmable network interface 214, print processor 224, and printing engine 240. Other elements may be included in MFD 200 but are not described here in the interest of conciseness.

In operation, print processor 224 monitors one or more characteristics associated with operation of MFD 200 while MFD 200 is operating in a first mode of operation. The first mode of operation is intended to be a normal mode operation that has all components elements of MFD 200 fully operational. As described in the present application, a characteristic is any item, specification, feature, element, computation, or output that is included as part of, or associated with, a device, such as MFD 200. The characteristics that may be monitored include, but are not limited to, a time period of inactivity, time of day, day of the week, and a user entry on user interface 212 to cease operation in the first mode. As described in the present application, monitoring is any form of evaluation or determination of the continuing functionality and operation of any aspect of a device, such as MFD 200. Print processor 224 further determines when a value of one or more of the monitored characteristics exceeds a threshold value. For example, print processor 224 may determine that the time of day has reached a time that is past the time established for ceasing to operate in the first mode of operation.

Print processor 224 additionally communicates programming information associated with operation in a second mode of operation to programmable network interface 214 when it is determined that the value of the one or more characteristics exceeds the threshold value. The programming information allows programmable network interface 214 to maintain communication with the network (e.g., network 120 in FIG. 1) when MFD 200 operates in the second mode of operation. MFD 200 begins operation in the second mode of operation when the programming of programmable network interface 214 with the information is complete. The second mode of operation is intended to be a low power mode that maintains many of the elements in the MFD 200, including print processor 224, in a low power or standby state for energy use. Programmable network interface 214 is maintained in full power or normal mode in the second mode of operation in order to maintain communication with the network.

Programmable network interface 214 includes logic for communicating with a network (e.g., network 120) in at least the two modes of operation described above. In some embodiments, programmable network interface 214 further monitors one or more characteristics associated with communication on the network (e.g., network 120) while MFD 200 operates in the second mode of operation. The characteristics may be elements of messages received by programmable network interface 214 from the network. These elements may include, but are not limited to, messages not directed to MFD 200, network management protocol messages, messages including requests for activity by MFD 200. Programmable network interface 214 may additionally determine when the one or more characteristics associated with network communication meets a defined criterion. For example, the defined criteria may be a message that includes a request for operation of MFD 200, such as a request for a print job initiated by a user.

In some embodiments, programmable network interface 214, while operating in the second mode of operation, is configured with additional logic to provide a signal to print processor 224 to exit a low power or standby state and resume a normal operating or full power state when it is determined that the at least one characteristic associated with network communication meets the defined criteria.

Based on resuming normal operating or full power state, print processor 224 communicates programming information associated with operation of MFD 200 in the first mode of operation to programmable network interface 214, and may further provide signals to other elements in MFD 200 to resume normal or full power state. MFD 200 returns to operating in the first mode of operation when the programming or re-programming of programmable network interface 214 is complete.

In some embodiments, programmable network interface 214 may also be configured, in the second mode of operation, to include control or processing logic to filter unwanted message received from the network and provide valid communication responses to received network management protocol communication requests while operating in the second mode of operation. Further, in some embodiments, programmable network interface 214 may be configured, in the first mode of operation, to include additional logic associated with specific operations of other elements in MFD 200, such as printing engine 240 or user interface 212.

Print processor 224 may also be referred to as an image processor and operates in a different manner than a general purpose processor because it is specialized for processing image data. Further, print processor 224 along with storage element 210 may also be referred to as a copy control system (CCS). A printing mechanism is initiated by instructions in signals communicated from print processor 224 to printing engine 240. Media path 236 is positioned to supply continuous media or sheets of print media (e.g., paper, cardstock, or velum) from sheet supply 230 to the marking device(s) included in printing engine 240. After printing engine generates and applies various markings to sheets of print media, the sheets may optionally pass to finisher 234 which can flip, fold, staple, sort, collate etc., the various printed sheets based on the additional information associated with printing the electronic document.

Printing engine 240 may include any marking device that applies a marking material (e.g., toner, inks, etc.) to continuous print media or sheets of print media, whether currently known or developed in the future and can include, for example, devices that use a photoreceptor belt or an intermediate transfer belt or devices that print directly to print media (e.g., inkjet printers, ribbon-based contact printers, etc.). Scanner/document handler 232 may be used for feeding or re-feeding (e.g., in duplex print mode) printed media sheets, either automatically or manually with inputs from a user, in any of the printing, scanning or faxing modes available. Sheet supply 230 may include one or more trays for storing and positioning printable media for entry onto media path 236. Sheet supply 230 may include a bypass tray that allows external print media, such as previously printed pages to be added and entered into media path 236 for marking instead of, or in addition to, any printable media already in sheet supply 230. It is important to note that printing engine 240 along with sheet supply 230, scanner document handler 232, finisher 234 and media path 236 may collectively be referred to as an image output terminal (IOT).

As part of the printing function in MFD 200, user interface 212 displays one or more menus that may include various print options for the print jobs to be printed. In some instances, user interface 212 may be referred to as a local user interface or LUI. User interface 212 or LUI may receive instructions for displaying the menus from print processor 224 and may further provide entry information to print processor 224. User interface 212 may also include a low power or standby state as part of a second mode of operation. The low power or standby state minimizes unnecessary response to user interactions or display of information unless the user provides a proper wakeup entry. It is important to note that the wakeup entry made by a user may initiate a return of MFD 200 to the first mode of operation.

MFD 200 may also be constructed and implemented as a set of modules that may be interchangeable between a plurality of printers. In some embodiments, MFD 200 may be constructed using an IOT coupled to a CCS, as described above, and further including an LUI, a power supply, and a network interface. Any one of these of the modules may be interchangeable with any like modules from other models, providing some level of flexibility and efficiency between products. As a result, one or more aspects of the present embodiments may be implemented as part of the CCS in printing device. In some embodiments, the CCS includes a memory for storing information associated with programming a programmable network interface device (e.g., programmable network interface 214) to operate in at least two operating modes. The CCS may further include a processor configured to determine when a value of at least one characteristic associated with operating in a first mode of operation exceeds a threshold value. The processor further communicates programming information associated with operation of the programmable device in a second mode of operation to the programmable device when it is determined that the value of the at least one characteristic exceeds the threshold value, the programming information changing the conditions associated with local network communication by the programmable device. The CCS may also carry out other functions and mechanisms associated with energy saving in MFD 200 as described herein.

Figure 3:
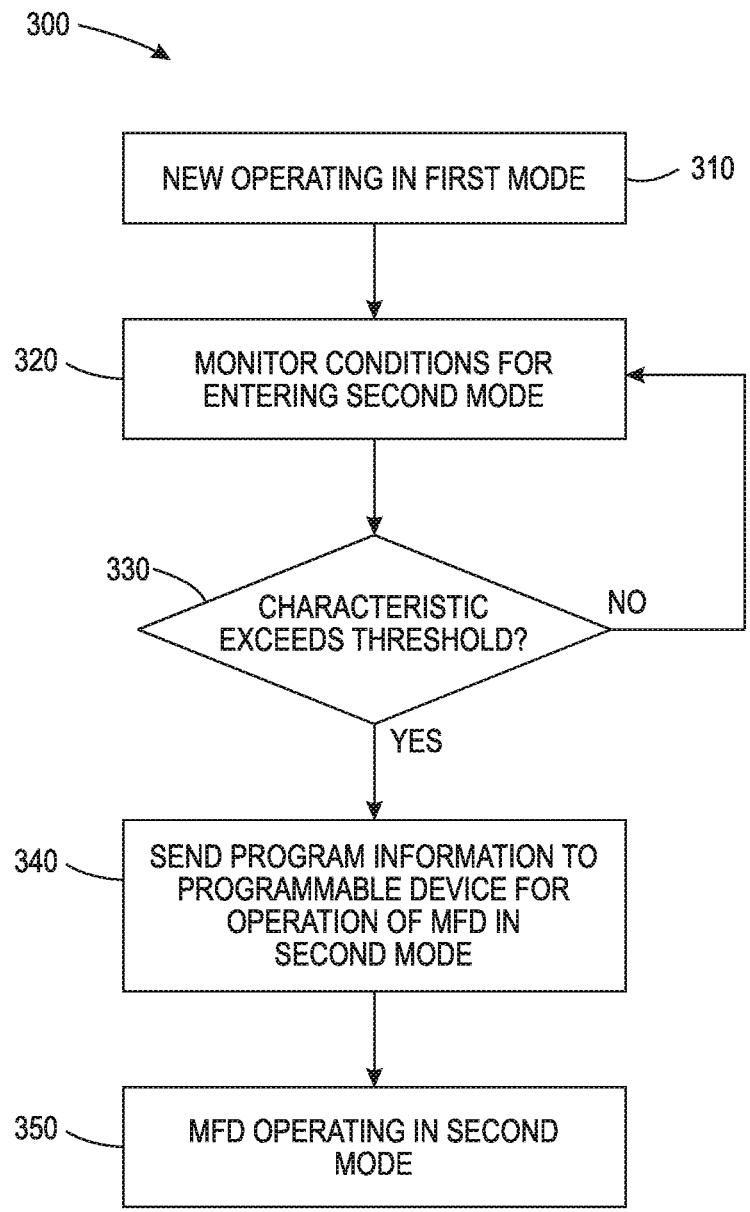
FIG. 3 depicts an exemplary process for implementing the principles of reducing energy use in a printing device or MFD.

FIG. 3 illustrates an exemplary process 300 for reducing energy use in a printing device or MFD. Process 300 is primarily described with respect to a printer/scanner/copier or MFD, such as MFD 200 described in FIG. 2. Process 300 may also be performed by a printer in combination with other functions, such as in MFDs 130a-130d described in FIG. 1. Further, process 300 may be performed in a combination of devices, such as user devices 110a-110c, MFDs 130a-130d, and network storage 140 described in FIG. 1. Although process 300 depicts steps performed in a particular order for purposes of illustration and discussion, the operations discussed herein are not limited to any particular order or arrangement. One skilled in the art, using the disclosures provided herein, will also appreciate that one or more of the steps of process 300 may be omitted, rearranged, combined, and/or adapted in various ways.

At step 310, a printing device or MFD, such as MFD 200, operates in a first mode of operation. As described above, the first mode includes operating as normal or in full operation and may be referred to as wake mode or awake mode. The MFD may be operating in the first mode for some period of time or further may operate in the first mode as part of completion of a power-on or power-up sequence or a reset sequence. It is important to note that a reconfigurable network interface device, such as programmable network interface 214, used for communication on a network (e.g., network 120) by the MFD, may be initialized with program instructions and configured to operate in the first mode of operation.

At step 320, one or more conditions for entering a second mode of operation are monitored. As described above, the second mode includes operating in standby or in sleep operation and may be referred to as energy saver mode or reduced energy mode. The conditions may be specific operating characteristics associated with the MFD in the first mode of operation or may be a specific user entry made on a user interface (e.g., user interface 212) to enter a second mode of operation. The operating characteristics may include, but are not limited to, time of day, day of the week, and elapsed time of inactivity. As part of monitoring conditions, at step 320, a main processor (e.g., print processor 224) may initiate and retrieve data from one or more countdown timers associated with monitoring inactivity, including inactivity in relation to time of day or day of the week.

At step 330, a determination is made as to whether one or more of the characteristics being monitored as part of the process, at step 320, have reached a limit value, reached a trigger, or exceeded a threshold value. In some embodiments, the determination may be performed in the main processor by comparing the one or more countdown timers to a value identified as the threshold for inactivity (e.g., 60 minutes of inactivity during work hours) and determining if the value on a countdown timer exceeds the threshold value. Further, the time of day or day of the week maintained by the main processor may be checked for exceeding different threshold values set for nominal and/or extended hours of work or operation at the facility (e.g., after 7 PM or any time on Saturday and Sunday). It is important to note that a threshold value for inactivity may also be used in conjunction with the time of day or day of the week threshold and may be different within and outside of the threshold values set for nominal and/or extended hours of work or operation. Further, the determination, at step 330, may include a specific user entry for satisfying the condition, as described above.

If, at step 330, the determination is made that a value for one of the characteristics, as part of the conditions for entering the second mode of operation, has not exceeded a threshold value, then process 300 returns to step 320 to continue monitoring the conditions for entering the second mode of operation. If, at step 330, the determination the value for one of the characteristics has exceeded the threshold value, then, at step 340, a set of program instructions and programming information is sent or communicated from the main processor (e.g., print processor 224) to the reconfigurable network interface device (e.g., programmable network interface 214). Program instructions and program information include software or firmware code for programming or configuration the reconfigurable network interface device to operate in the second mode of operation. The program instructions may be sent through the internal communication bus that is coupled between the elements in the MFD (e.g., MFD 200) or may be communicated using a dedicated programming bus between the main processor and reconfigurable network interface device. Program instructions may be stored in and retrieved from an internal memory in the main processor. In some embodiments, the program instructions may be stored in and retrieved from a memory or storage (e.g., storage element 210) and communicated to the main processor before being communicated, along with programming information, to the reconfigurable network interface device.

At step 350, after the programming is completed at step 340, the MFD (e.g., MFD 200) enters or begins operating in the second mode of operation (e.g., standby mode). The second mode of operation maintains operation of the reconfigurable network interface device (e.g., programmable network interface 214) as fully operational and configured while maintaining the main processor (e.g., print processor 224) in a low power, standby, or sleep state. The main processor may remain in a low power, standby, or sleep state as part of the low power or standby mode of the printing device or MFD until an event, such as entry from a user on a user interface (e.g., user interface 212) or a message communicated to the reconfigurable network interface device from the network (e.g., network 120) initiates some activity (e.g., a request for a print, copy, or scan job) on the MFD.

Figure 4:
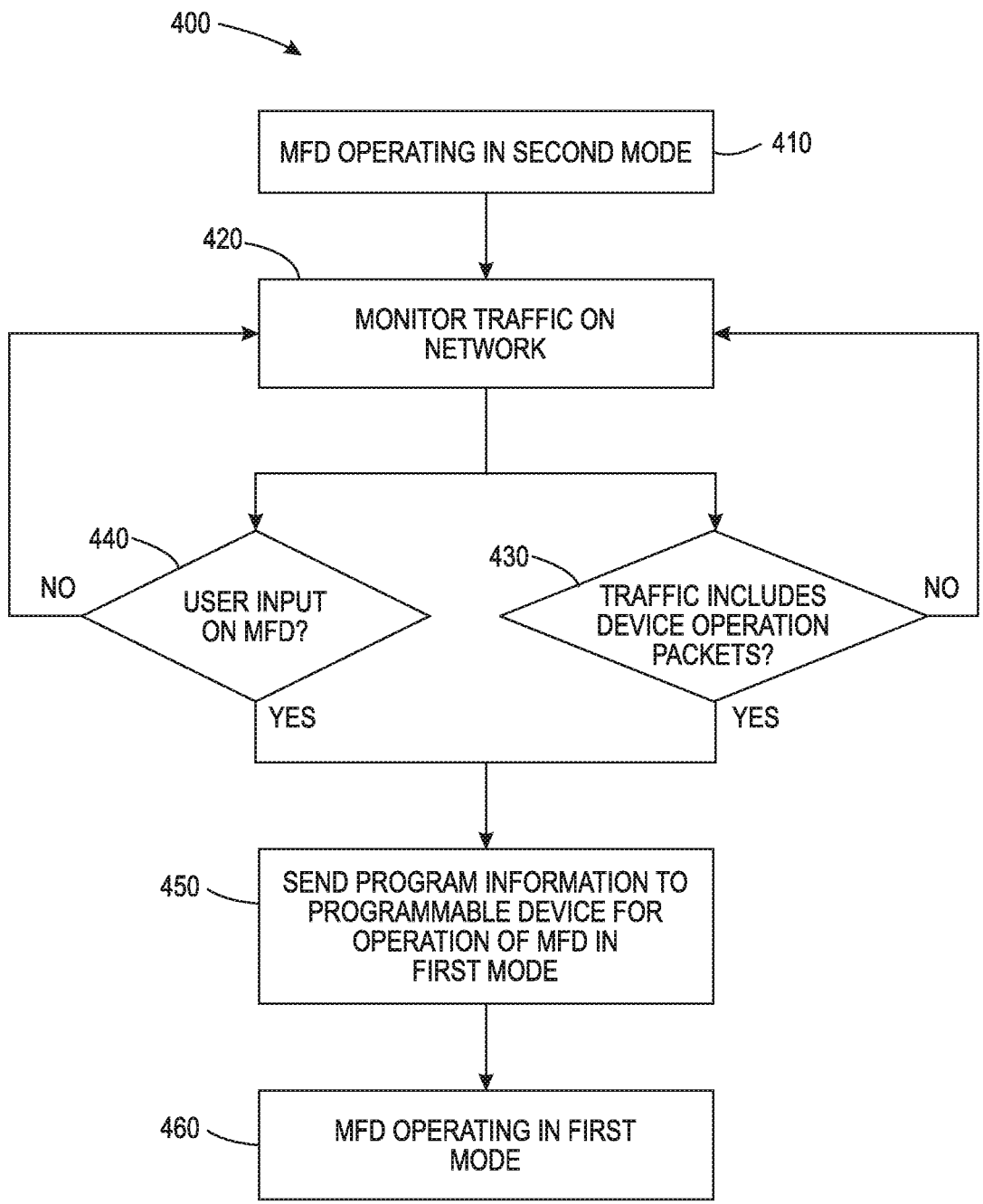
FIG. 4 depicts an exemplary process for implementing the principles of reducing energy use in a printing device of MFD.

FIG. 4 illustrates another exemplary process 400 for reducing energy use in a printing device or MFD. Process 400 is primarily described with respect to a printer/scanner/copier or MFD, such as MFD 200 described in FIG. 2. Process 400 may also be performed by a printer in combination with other functions, such as MFDs 130a-130d described in FIG. 1. Further, process 400 may be performed in a combination of devices, such as user devices 110a-110c, MFDs 130a-130d, and network storage 140 described in FIG. 1. In some embodiments, process 400 may be used as a continuation of, or otherwise combined with, one or more of the steps of process 300 described in FIG. 3. Further, although process 400 depicts steps performed in a particular order for purposes of illustration and discussion, the operations discussed herein are not limited to any particular order or arrangement. One skilled in the art, using the disclosures provided herein, will also appreciate that one or more of the steps of process 400 may be omitted, rearranged, combined, and/or adapted in various ways.

At step 410, a printing device or MFD, such as MFD 200, operates in a second mode of operation. As described above, the second mode includes operating in a standby or sleep state as described above, such as in step 350 in FIG. 3. The MFD may be operating in the second mode for some period of time as a result of a long period of inactivity or further may operate in the second mode as part of initial operation after a power-on or power-up sequence or a reset sequence. It is important to note that a reconfigurable network interface device (e.g., programmable network interface 214), operating as described above in the MFD, may be initialized with program instructions to operate in the second mode of operation. For example, the reconfigurable network interface device may include control logic to filter messages received from the network and provide valid communication responses to received network management protocol communication requests without having to communicate, interrupt, or wake the main processor (e.g., print processor 224).

At step 420, communication traffic from the network (e.g., network 120) is received and monitored. The communication traffic is received and monitored in the reconfigurable network interface device (e.g., programmable network interface 214). The communication traffic may include messages incorporating data arranged in packets with identifiers associated with various packet types. The packet types may be segregated into network management type packets and device operation type packets. Network management type packets may include packets or messages requesting network protocol updates or status and may vary depending on the particular protocol used by the network. Device operation type packets may include packets or messages requesting an operation from the printing device or MFD. For example, a message using device operation type packets may include a request from a user to print an electronic document as part of a print job provided to the printing device or MFD over the network.

It is important to note that some of the communication traffic may not be directed to the printing device or MFD. These messages may be filtered by the reconfigurable network interface device and discarded. Further, some messages including network management type packets may request a response as part of the protocol. The reconfigurable network interface device may generate and provide these responses to the network without interrupting or waking the main processor from the low power or standby state as a result of the programming instructions provided by the main processor as part of entering the second mode of operation.

At step 430, a determination is made as to whether a message communication as part of the traffic monitored from the network includes device operation type packets. The determination is performed in the reconfigurable network interface device (e.g., programmable network interface 214) as part of filtering and processing the traffic from the message. For example, the reconfigurable network interface device may parse the incoming message to identify the packet type and compare the packet type against a list of identified packets provided as part of the programming information from the main processor (e.g., print processor 224). Further, the reconfigurable network interface device may include logic to communicate a signal to the main processor to wake from the low power or standby state.

At step 440, a determination is made as to whether an input has been provided by a user on the MFD (e.g., MFD 200) in conjunction with a request for operation. The input may be made on a user interface (e.g., user interface 212) and may include pressing a button, swiping or touching a panel as part of a display, or providing a voice command entry. The user interface detects the input and provides a signal to the main processor (e.g., print processor 224) to wake from the low power or standby state. It is important to note that although the determination, at step 440 is shown as in parallel with the determination, at step 430, the determination, at step 440 may be sequential and occur before or after the determination, at step 430.

If, at step 430, the determination is made that the message communicated from the network does include device operation type packets, then process 400 returns to step 420 to continue monitoring traffic associated with entering the first mode of operation. Further, if, at step 440, the determination is made that no input has been provided by the user on the MFD, then 400 also returns to step 420.

If, at step 430, the determination is made that the message communicated from the network includes device operation type packets or, at step 440, the determination is made that an input has been provided by the user on the MFD, then, at step 450, the main processor (e.g., print processor 224) begins operating in full power or normal operational state and sends or communicates a set of program instructions and programming information to the reconfigurable network interface device (e.g., programmable network interface 214). The program instructions and program information include software or firmware code for programming and configuring the reconfigurable network interface device, in a manner similar to that described above, to operate in the first mode of operation.

At step 460, after the programming is completed at step 450, the MFD (e.g., MFD 200) enters or begins operating in the first mode of operation (e.g., wake mode). The first mode of operation maintains full operation of all components, functions, and features of the MFD with the main processor (e.g. print processor 224) managing, filtering and responding to messages and requests as part of communication on the network (e.g., network 120). The printing device or MFD may remain operating in the first or normal mode of operation until an event or determination that an operating characteristic, such as a period of time of inactivity or identification of a time of day or day of the week reaches a threshold to enter the second or low power mode again.

It is important to note that one or more of the steps of process 400 may be omitted or re-arranged without changing the result of the process. For example, the determination, at step 440, may not be included as part of process 400 and/or may be controlled through a different process.

It is important to note that process 400 may be operatively coupled to, or associated with, process 300 described in FIG. 3 to create a single process that may function iteratively. For example, step 350 in process 300 may be replaced by step 410 in process 400. Similarly, step 460 in process 400 may be replaced by step 310 in process 300 to allow continuous transition between the first mode of operation to the second mode of operation based on the conditions for transitioning between the modes along with reprogramming of the reconfigurable network interface device using the main processor as described above.

Figure 5A:
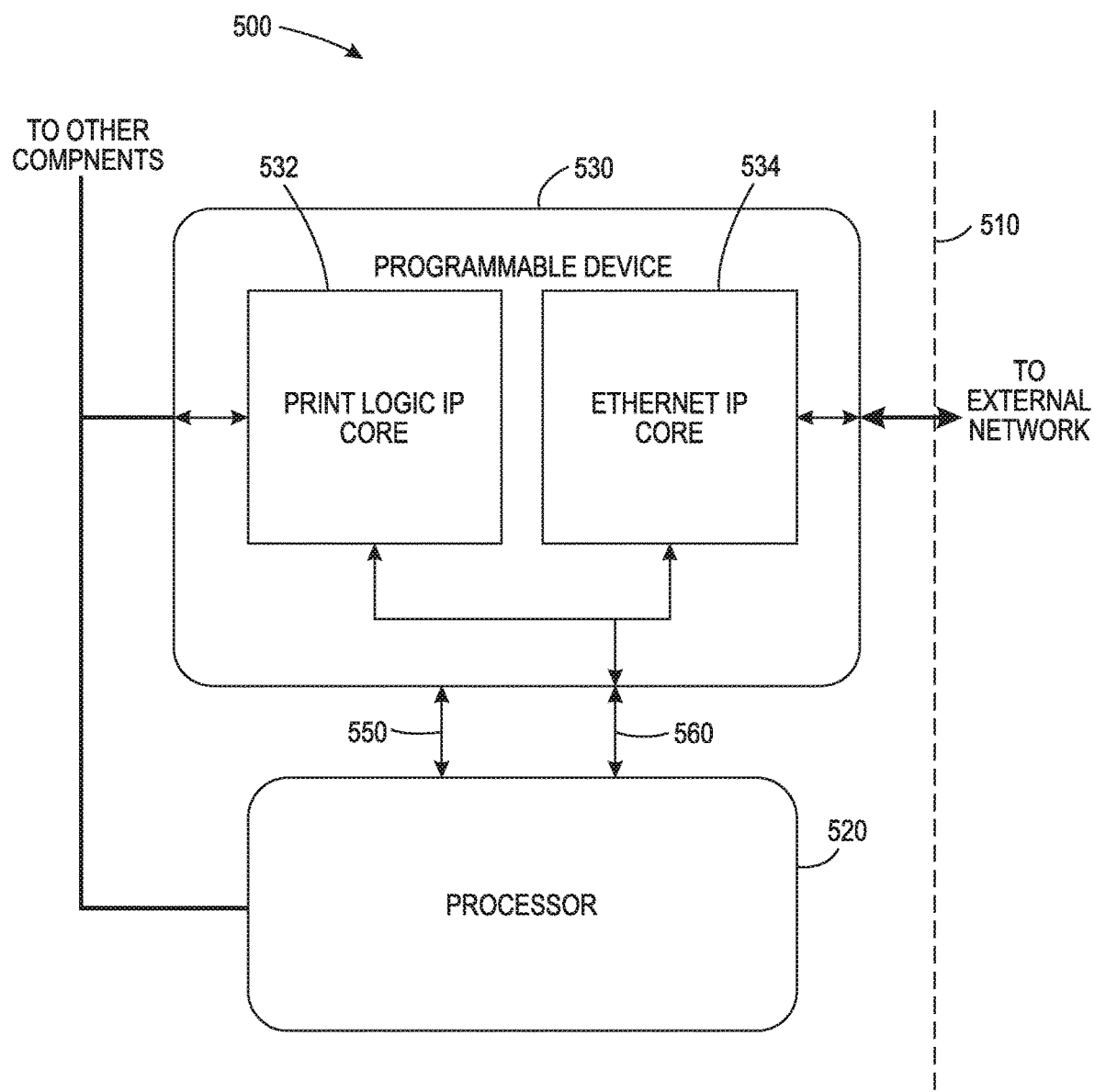
FIG. 5A depicts a portion of an exemplary electrical block diagram in a first configuration incorporating the principles of reducing energy use in a printing device or MFD.
Figure 5B:
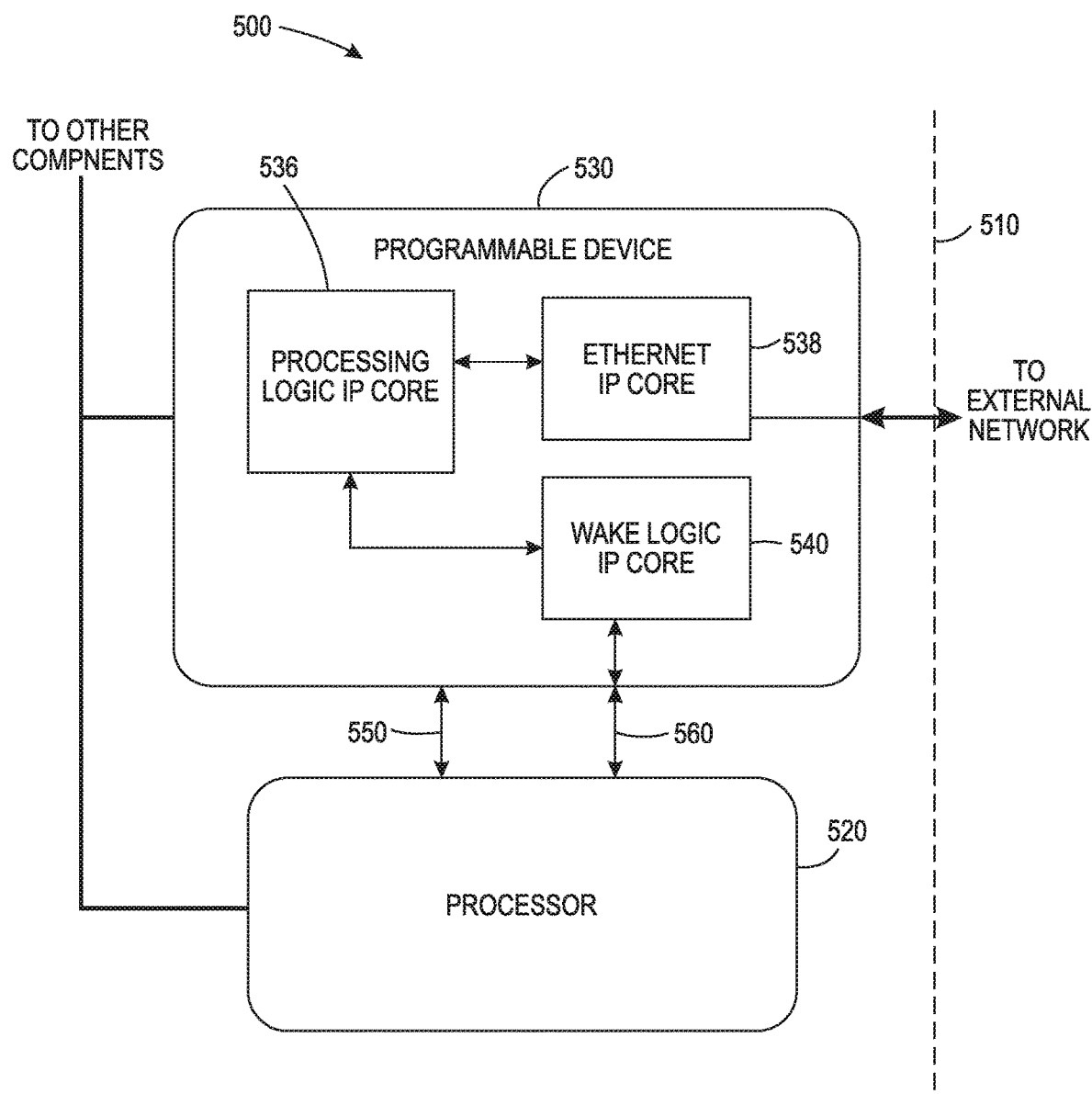
FIG. 5B depicts a portion of the exemplary electrical block diagram in a second configuration incorporating the principles of reducing energy use in a printing device or MFD.

FIGS. 5A and 5B illustrate an exemplary block diagram 500 for a portion of an exemplary printing device or MFD, configured in two different operating modes, which can be used as part of reducing energy in the printing device or MFD. Block diagram 500 may be incorporated as part of a printing device or MFD, such as MFD 200 described in FIG. 2 or MFDs 130a-130d described in FIG. 1. Block diagram 500 may also be embodied as, or incorporated in, a printer, copier, multi-function machine, or other device that includes the capability to print, scan, and/or copy a document, including an electronic document, on a physical printable and/or readable media, such as paper. Block diagram 500 includes a processor 520 coupled to a programmable device 530, both included as part of a printing device or MFD indicated by a dashed boundary line 510. An internal communication interface is shown operatively coupling processor 520 and programmable device 530 and further operatively coupling other components (not shown) included in the printing device or MFD. An external interface also operatively couples programmable device 530 to an external network, such as network 120 described in FIG. 1. Two local communication interfaces, a programming interface 550 and a data transfer interface 560, further operatively couple processor 520 to programmable device 530. Other elements or components may be included in the printing device or MFD, as necessary for operation (e.g., elements described in FIG. 2), but are not described here in the interest of conciseness. It is important to note that although FIGS. 5A and 5B are described in conjunction with a network using an Ethernet protocol, the principles of the embodiments may be applied to other networks, such as wireless or cellular networks as described above.

Programmable device 530 may be embodied as one or more of several programmable and reconfigurable electronic devices including, but not limited to, a field programmable gate arrays (FPGA), a complex programmable logic device (CPLD), a network processing unit (NPU), and the like. Programmable device 530 primarily includes the functionality for interfacing with a communication network (e.g., network 120 in FIG. 1), in a manner similar to that described above for programmable network interface 214 in FIG. 2. Programmable device 530 is configured or programmed to include functions associated with interfacing to the communication network for the printing device or MFD in different operating modes at different times. Programmable device 530 may further include additional functionality other than interfacing to the communication network for one or more of the operating modes, such as product specific functionality, based on product development decisions.

Processor 520 may be embodied as one or more microprocessors, graphic processing units (GPUs), visual processing units (VPUs), arithmetic logic units (ALUs), and the like. Processor 520 primarily includes the functionality for managing and controlling the operation and functionality of the printing device or MFD, in a manner similar to that described above for print processor 224 in FIG. 2. Processor 520 additionally provides programming code and/or information to programmable device 530 using programming interface 550. The programming code and/or information may be stored in, and retrieved from, a cache memory in processor 520. The programming information may also be stored in, and retrieved from, a storage element in the printing device or MFD (e.g., storage element 210) or in a storage element external to the printing device or MFD (e.g., network storage 140).

FIG. 5A shows programmable device 530 configured or programmed to operate in a first, or full power, operating mode, sometimes referred to as run mode. The configuration is initiated by processor 520 providing program code and instructions for configuring programmable device 530 through programming interface 550 to include a print logic intellectual property (IP) core 532 and an Ethernet IP core 534. Processor 520 further provides program code and instructions for configuring data transfer interface 560 to operate as a data communication bus for print logic IP 532 core and Ethernet IP core 534. Processor 520 may provide the program instructions either during a power on or reset initialization or operating mode change for the printing device or MFD, as described above.

Print logic IP core 532 includes image processing functions along other input/output communications functions, such as universal asynchronous receiver-transmitters (UARTS) and the like, specific protocols, such as serial peripheral interface (SPI) and the like, and connection interfaces, such as field device integration (FDI) and the like, for the other components in the printing device or MFD. By including print logic IP core 532, product specific configuration of implementation specific functions may be implemented without wholesale development changes allowing for a product design to utilize a single processor and core programming code or firmware in several different types and lines of printing devices and/or MFDs with different sets of features.

Ethernet IP core 534 includes the functionality necessary to transmit and receive signals according to the required protocols for Ethernet communication with a network (e.g., network 120) Ethernet IP core 434 may include an integrated Institute of Electrical and Electronics Engineers (IEEE) standard 802.3-compliant Media Access Controller (MAC), using a 10 megabit broadband signaling on twisted pair wire (10Base-T) physical layer (PHY) with full/half duplex operation including auto-negotiation and automatic polarity detection and correction, and 8 kilobytes of memory. The data for coding, conversion, and transmission, as well as the data, received and decoded by Ethernet IP core 534, is passed between Ethernet IP core 534 in programmable device 530 and processor 520 using the bus communication configuration of data transfer interface 560.

In operation, processor 520 receives all data communicated as a message or request to the printing device or MFD over the network (e.g., network 120) through Ethernet IP core 534. Processor 520 will process and filter the data and provide data for response to those messages or requests, as necessary, to Ethernet IP core 534 from communication on the network. Processor 520 may also initiate further activity on the printing device or MFD if the message or request includes some operation on the printing device or MFD, such as printing.

FIG. 5B shows programmable device 530 configured or programmed to operate in a second, or low power, operating mode, sometimes referred to as sleep mode. The configuration is initiated by processor 520 providing program code and instructions for configuring programmable device 530 through programming interface 550 to include a processing logic IP core 536, an Ethernet IP core 538, and a wake logic IP core 540. Processor 520 further provides program code and instructions for configuring data transfer interface 560 to operate as a simple communication bus for wake logic IP core 540. Processor 520 may provide the program instructions either during a power on or reset initialization or operating mode change for the printing device or MFD, as described above.

Ethernet IP core 538 includes functionality necessary to transmit and receive signals according to the required protocols for Ethernet communication with a network (e.g., network 120), as described for Ethernet IP core 534 above. Ethernet IP core 538 additionally includes a different internal communication interface to provide data and information transfer internally with processing logic IP core 536 instead of with processor 520 through data transfer interface 560, as described above. In some embodiments, Ethernet IP core 538 may be operationally different from Ethernet IP core 534 described above. For example, Ethernet IP core 538 may include reduced features or reduced performance elements, such as slower decoding, processing, in order to further reduce the electrical energy use in low power or standby mode. The lowered performance should not affect the overall operation of the printing device or MFD during the time of no activity while in low power or standby mode.

Processing logic IP core 536 includes logic for processing data received as a communication message using the Ethernet protocol from the network (e.g., network 120) and decoded by Ethernet IP core 538. Processing logic IP core 536 filters the data provided from Ethernet IP core 538 and determines which messages are directed to the printing device or MFD. Processing logic IP core 536 discards unwanted messages not directed to the printing device or MFD based on filtering the data. Processing logic IP core 536 also, as necessary, generates data as part of a response to the communication from the network and provides the data to Ethernet IP core 538 for coding, conversion, and transmission on the network based on message packet type. For instance, Processing Logic IP core 536 may generate automatic responses for network management packet types based on instructions downloaded from processor 520 as part of programming and configuration. Network management packet types may include, but are not limited to, an address resolution packet (ARP), a ping packet, an internet control message protocol (ICMP) packet, and a multicast domain name system (mDMS) packet.

Wake logic IP Core 540 includes logic for processing specific data received from processing logic IP core 536 and initiating communication with processor 520 when the processing logic IP core 536 identifies a message including a request to perform an operation in the printing device or MFD (e.g., a request for a print job). Wake logic IP core 540 may provide a signal to processor 520 to initiate run mode using data transfer interface 560 configured as a single interrupt control line or configured as a clocking control line along with a data bus. The signal from Wake logic IP core 540 causes processor 520 to wake and initiate full operation and further initiate an operating mode change from the low power, standby, or sleep mode to normal, full power, or run mode, as described above.

The terms printer, MFD, or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color or monochrome, or handle color or monochrome image data. All foregoing systems and methods are specifically applicable to electrostatographic and/or xerographic machines and/or processes. Further, the terms automated or automatically mean that once a process is started (by a machine or a user), one or more machines perform the process without further input from any user.

While some of the embodiments have been described in the general context of program modules or nodes that execute in conjunction with an application program that runs on an operating system on a computing device, those skilled in the art will recognize that aspects may also be implemented in combination with other program modules or nodes.

Generally, program modules or nodes include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communication network. In a distributed computing environment, program modules may be located in both local and remote memory storage devices.

Some of the embodiments described above may further be implemented as a computer-implemented process (method), a computing system, or as an article of manufacture, such as a computer program product or computer readable media. The computer program product may be a computer storage medium readable by a computer system and encoding a computer program that includes instructions for causing a computer or computing system to perform example process (es). The computer-readable storage medium is a computer-readable memory device. The computer-readable storage medium can, for example, be implemented via one or more of a volatile computer memory, a non-volatile memory, a hard drive, a flash drive, a floppy disk, or a compact disk, and comparable media.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid-state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

Although embodiments which incorporate the teachings of the present disclosure have been shown and described in detail herein, those skilled in the art can readily devise many other varied embodiments that still incorporate these teachings. Having described preferred embodiments of apparatuses, systems, and methods for reducing energy use in a multi-function device (which are intended to be illustrative and not limiting), it is noted that modifications and variations can be made by persons skilled in the art in light of the above teachings. It is, therefore, to be understood that changes may be made in the particular embodiments of the disclosure disclosed which are within the scope of the disclosure as outlined by the appended claims.

What is claimed is:

1. A multi-function apparatus, comprising:
a programmable device configured to be programmed by a processor through one or more local communication interfaces for operation in a first and a second mode, the programmable device reconfigurable between the first and second modes to change one or more cores present on the programmable device,
in the first mode of operation, the programmable device programmed to comprise:
a network protocol core, the network protocol core configured in the first mode to:
communicate with a network through one or more external communication interfaces, and
relay a message from the network to the processor, and
in the second mode of operation, the programmable device programmed to further comprise a processing logic core and a mode conversion core, the programmable device in the second mode of operation comprising:
the network protocol core configured in the second mode to:
communicate with the network through the one or more external communication interfaces, and
relay a message from the network to the processing logic core,
the processing logic core configured to:
filter the message relayed from the network, the filtering comprising identifying the message as an operable request or a non-operable request, wherein the operable request is a request for the multi-function apparatus to perform an operation that the multi-function apparatus can perform in the first mode of operation and a non-operable request is a request for the apparatus to perform an operation that the apparatus cannot perform in the first mode of operation,
send a response to the message through the network protocol core, and
send the operable request to a mode conversion core, and
the mode conversion core configured to:
receive the operable request from the processing logic core, and
relay the operable request to the processor;
the processor, in the first mode of operation configured to:
  control operation of the multi-function apparatus,
  program the programmable device to enter the first mode of operation after receipt of the operable request,
  receive the message from the network through the network protocol core,
  send the response to the message to the network through the network protocol core, and
  program the programmable device to enter the second mode of operation after a predetermined threshold is satisfied, or a second mode conversion command is received, or both, and
in the second mode of operation configured to:
  receive the operable request from the mode conversion core;
  enter the first mode of operation after receipt of the operable request or a first mode conversion command;
the one or more local communication interfaces linking the programmable device and the processor; and
the one or more external communication interfaces linking the multi-function apparatus to the network through the programmable device.

2. The multi-function apparatus of claim 1, wherein the first mode of operation is a normal operating mode and the second mode of operation is a low power operating mode.

3. The multi-function apparatus of claim 1, wherein the operable request for operation of the multi-function apparatus comprises a request for a print job initiated by a user.

4. The multi-function apparatus of claim 1, wherein the predetermined threshold comprises a length of time of inactivity for the multi-function apparatus.

5. The multi-function apparatus of claim 1, wherein the predetermined threshold is dependent on a time of day, or a day of the week, or both.

6. The multi-function apparatus of claim 1, wherein the second mode conversion command is entered by a user at a graphic user interface of the multi-functional apparatus.

7. The multi-function apparatus of claim 1, wherein the programmable device in the first mode of operation further comprises a print logic core, the print logic core configured for image processing and one or more communication functions.

8. The multi-function apparatus of claim 1, wherein the programmable device comprises one or more of a field programmable gate arrays (FPGA), a complex programmable logic device (CPLD), and a network processing unit (NPU).

9. The multi-function apparatus of claim 1, wherein the network protocol core is an Ethernet protocol core.

10. A method, comprising:
  programming, by a processor of a multi-function apparatus, a programmable device reconfiqurable between a first mode and a second mode to change one or more cores present on the programmable device to enter the second mode of operation from the first mode of operation after a predetermined threshold is satisfied, or a second mode conversion command is received, or both, the programmable device in the first mode of operation comprising a network protocol core, and the programmable device in the second mode of operation comprising a processing logic core, the network protocol core, and a mode conversion core;
  receiving, by the network protocol core, a message from a network;
  relaying, by the network protocol core, the message to the processing logic core;
  filtering, by the processing logic core, the message relayed from the network, the filtering comprising identifying the message as an operable request or a non-operable request, wherein the operable request is a request for the multi-function apparatus to perform an operation that the multi-function apparatus can perform in the first mode of operation and a non-operable request is a request for the multi-function apparatus to perform an operation that the multi-function apparatus cannot perform in the first mode of operation;
  sending, by the processing logic core, the operable request to the mode conversion core;
  receiving, by the mode conversion core, the operable request;
  relaying, by the mode conversion core, the operable request to the processor;
  receiving, by the processor in the second mode of operation, the operable request from the mode conversion core;
  entering, by the processor, the first mode of operation from the second mode of operation after receipt of the operable request or a first mode conversion command; and
  programming, by the processor, the programmable device, to operate in the first mode of operation after receipt of the operable request or the first mode conversion command.

11. The method of claim 10, wherein the predetermined threshold comprises a length of time of inactivity for the multi-function apparatus.

12. The method of claim 10, wherein the first mode of operation is a normal operating mode and the second mode of operation is a low power operating mode.

13. The method of claim 10, wherein the operable request of the multi-function apparatus comprises a request for a print job initiated by a user.

14. The method of claim 10, wherein the operable request for operation of the multi-function apparatus comprises a request for a print job initiated by a user.

15. An apparatus comprising:
  a memory storing programming information for programming a programmable device to operate in first and second modes of operation, the programmable device reconfiqurable between the first and second modes to change one or more cores present on the programmable device; and
  a processor configured to:
    determine during the first mode of operation whether a predetermined threshold is satisfied or a second mode conversion command is received, or both,
    communicate programming information for the programmable device to operate in the second mode of operation from the memory to the programmable device when the threshold is satisfied, the programmable device in the first mode of operation comprising a network protocol core, and the programmable device in the second mode of operation comprising a processing logic core, the network protocol core, and a mode conversion core, the programmable device configured to:
      receive, by the network protocol core, a message from a network,
      relay, by the network protocol core, the message to the processing logic core, filter, by the processing logic core, the message relayed from the network, the filtering comprising identifying the message as an operable request or a non-operable request, wherein the operable request is a request for the apparatus to perform an operation that the apparatus can perform in the first mode of operation and a non-operable request is a request for the apparatus to perform an operation that the apparatus cannot perform in the first mode of operation;

send, by the processing logic core, the operable request to the mode conversion core, receive, by the mode conversion core, the operable request, and relay, by the mode conversion core, the operable request to the processor, enter the first mode of operation from the second mode of operation after receipt of the operable request or a first mode conversion command, and communicate programming information for the programmable device to operate in the first mode of operation from the memory to the programmable device after receipt of the operable request or the first mode conversion command by the processor.

16. The apparatus of claim 15, wherein the predetermined threshold comprises a length of time of inactivity for the apparatus.

17. The apparatus of claim 15, wherein the operable request of the apparatus comprises a request for a print job initiated by a user.

18. The apparatus of claim 15, wherein the operable request for operation of the apparatus comprises a request for a print job initiated by a user.

19. The apparatus of claim 15, further comprising the programmable device.

* * * * *